US012585737B2

(12) United States Patent
Johnson

(10) Patent No.: US 12,585,737 B2
(45) Date of Patent: *Mar. 24, 2026

(54) SPLIT LEDGER SOFTWARE LICENSE PLATFORM

(71) Applicant: AT&T Intellectual Property I, L.P., Atlanta, GA (US)

(72) Inventor: Lars Johnson, Brooklyn, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 16 days.

This patent is subject to a terminal disclaimer.

(21) Appl. No.: 18/768,512

(22) Filed: Jul. 10, 2024

(65) Prior Publication Data

US 2024/0362304 A1     Oct. 31, 2024

Related U.S. Application Data

(63) Continuation of application No. 18/070,683, filed on Nov. 29, 2022, now Pat. No. 12,067,089, which is a
(Continued)

(51) Int. Cl.
*G06F 21/10* (2013.01)
*H04L 9/32* (2006.01)
*H04L 9/00* (2022.01)

(52) U.S. Cl.
CPC .......... *G06F 21/105* (2013.01); *H04L 9/3236* (2013.01); *G06F 21/1075* (2023.08); *H04L 9/50* (2022.05); *H04L 2209/56* (2013.01)

(58) Field of Classification Search
CPC .... G06F 21/105; G06F 21/1075; G06F 21/64; G06F 21/121; H04L 9/3236; H04L 9/50; H04L 2209/56; H04L 9/3239
See application file for complete search history.

(56) References Cited

U.S. PATENT DOCUMENTS 6,149,575 A     11/2000  Leonhardt
6,732,366 B1     5/2004  Russo et al.
(Continued)

FOREIGN PATENT DOCUMENTS

GB          2589542 A     6/2021
WO      2016127721 A1     8/2016
(Continued)

OTHER PUBLICATIONS

"Home: The world's first exchange to trade advertising contracts." NYIAX, nyiax.com, accessed: Mar. 2018. https://web.archive.org/web/20161212101141/http://www.nyiax.com:80/; pp. 1-6.
(Continued)

*Primary Examiner* — David Garcia Cervetti
(74) *Attorney, Agent, or Firm* — Guntin & Gust, PLC; Bryan S. Latham

(57) ABSTRACT

Aspects of the subject disclosure may include, for example, a processing system including a processor; and a memory that stores executable instructions that, when executed by the processing system, facilitate performance of operations, including requesting a license for software from first equipment of a license holder; receiving a passed ledger associated with the license from the first equipment of the license holder, wherein the passed ledger comprises a latest block; receiving a hash value for the latest block from a software vendor of the software; calculating a hash value for the latest block; and responsive to the hash value provided by second equipment of the software vendor matching the hash value calculated for the latest block: executing the software. Other embodiments are disclosed.

20 Claims, 7 Drawing Sheets

Related U.S. Application Data continuation of application No. 16/793,331, filed on Feb. 18, 2020, now Pat. No. 11,556,618.

(56) References Cited

U.S. PATENT DOCUMENTS

| | | | |
|---|---|---|---|
| 7,519,997 B2 | 4/2009 | Shipp | |
| 8,060,718 B2 | 11/2011 | Freitas et al. | |
| 8,954,588 B1 | 2/2015 | Bertz et al. | |
| 9,662,572 B1 | 5/2017 | Laskar | |
| 9,849,364 B2 | 12/2017 | Tran et al. | |
| 9,922,380 B2 | 3/2018 | Isaacson et al. | |
| 9,965,628 B2 | 5/2018 | Ford et al. | |
| 9,967,334 B2 * | 5/2018 | Ford | H04L 41/0806 |
| 10,185,595 B1 * | 1/2019 | Ramatchandirane | H04L 9/3236 |
| 10,438,290 B1 | 10/2019 | Winklevoss et al. | |
| 10,579,823 B2 | 3/2020 | Eigner et al. | |
| 10,600,050 B1 * | 3/2020 | Anton | G06Q 20/3672 |
| 10,992,649 B2 * | 4/2021 | Lobban | H04L 63/0442 |
| 11,132,707 B2 | 9/2021 | Johnson et al. | |
| 11,294,991 B2 | 4/2022 | Savanah et al. | |
| 11,366,882 B2 * | 6/2022 | Wright | H04L 9/3236 |
| 11,487,852 B2 | 11/2022 | Rahiman et al. | |
| 11,526,585 B2 | 12/2022 | Panikkar et al. | |
| 11,651,056 B2 * | 5/2023 | Drake | H04L 9/3239 705/59 |
| 11,829,510 B2 | 11/2023 | Dods et al. | |
| 11,861,697 B1 * | 1/2024 | De'Angeli | H04L 63/0823 |
| 2003/0073411 A1 | 4/2003 | Meade | |
| 2005/0210498 A1 | 9/2005 | Scott et al. | |
| 2007/0185814 A1 * | 8/2007 | Boccon-Gibod | H04L 9/3242 705/51 |
| 2009/0037963 A1 | 2/2009 | Murray et al. | |
| 2009/0089844 A1 | 4/2009 | Beyabani | |
| 2009/0300365 A1 | 12/2009 | Karmes et al. | |
| 2010/0073228 A1 | 3/2010 | Smith | |
| 2010/0083050 A1 | 4/2010 | Ohyama | |
| 2010/0223637 A1 | 9/2010 | Hubbard | |
| 2012/0023201 A1 | 1/2012 | Gideon et al. | |
| 2012/0210343 A1 | 8/2012 | McCoy et al. | |
| 2014/0025858 A1 | 1/2014 | Stark et al. | |
| 2014/0025918 A1 | 1/2014 | Stark et al. | |
| 2014/0025919 A1 | 1/2014 | Stark | |
| 2014/0025920 A1 | 1/2014 | Stark et al. | |
| 2014/0068109 A1 | 3/2014 | Stark | |
| 2014/0122350 A1 | 5/2014 | Takemoto et al. | |
| 2014/0122737 A1 | 5/2014 | Silberstein et al. | |
| 2014/0136814 A1 | 5/2014 | Stark | |
| 2015/0020127 A1 | 1/2015 | Doshi et al. | |
| 2015/0150075 A1 | 5/2015 | Vahlis et al. | |
| 2015/0156525 A1 | 6/2015 | Lemmons | |
| 2015/0295935 A1 | 10/2015 | Foerster et al. | |
| 2016/0055322 A1 | 2/2016 | Thomas | |
| 2016/0300223 A1 | 10/2016 | Grey et al. | |
| 2017/0046709 A1 | 2/2017 | Lee et al. | |
| 2017/0116693 A1 * | 4/2017 | Rae | G06Q 50/184 |
| 2017/0132620 A1 | 5/2017 | Miller et al. | |
| 2017/0134161 A1 | 5/2017 | Goeringer | |
| 2017/0169363 A1 | 6/2017 | Salmasi et al. | |
| 2017/0195747 A1 | 7/2017 | Haberman et al. | |
| 2017/0206522 A1 | 7/2017 | Schiatti et al. | |
| 2017/0221032 A1 | 8/2017 | Mazed et al. | |
| 2017/0249623 A1 | 8/2017 | Cole | |
| 2017/0262902 A1 | 9/2017 | Weston et al. | |
| 2017/0300876 A1 | 10/2017 | Musiala, Jr. et al. | |
| 2017/0308928 A1 | 10/2017 | Weston et al. | |
| 2017/0324738 A1 | 11/2017 | Hari et al. | |
| 2017/0358041 A1 | 12/2017 | Forbes, Jr. et al. | |
| 2017/0364552 A1 | 12/2017 | Pattanaik et al. | |
| 2017/0364936 A1 | 12/2017 | Balfour et al. | |
| 2018/0012262 A1 | 1/2018 | Gupta et al. | |
| 2018/0018695 A1 | 1/2018 | Gupta et al. | |
| 2018/0019984 A1 | 1/2018 | Isaacson et al. | |
| 2018/0053161 A1 | 2/2018 | Bordash et al. | |
| 2018/0078843 A1 | 3/2018 | Tran et al. | |
| 2018/0089436 A1 | 3/2018 | Smith et al. | |
| 2018/0115538 A1 | 4/2018 | Blake | |
| 2018/0183687 A1 * | 6/2018 | Dementev | H04L 41/50 |
| 2018/0247320 A1 | 8/2018 | Gauld | |
| 2018/0276626 A1 | 9/2018 | Laiben | |
| 2018/0276666 A1 | 9/2018 | Haldenby et al. | |
| 2018/0293363 A1 * | 10/2018 | Asati | G06F 21/10 |
| 2018/0300717 A1 * | 10/2018 | Haque | H04L 9/3213 |
| 2018/0308134 A1 | 10/2018 | Manning et al. | |
| 2018/0323979 A1 | 11/2018 | Ahn et al. | |
| 2018/0328612 A1 | 11/2018 | Sinha et al. | |
| 2018/0374173 A1 * | 12/2018 | Chen | G06F 9/466 |
| 2019/0019180 A1 * | 1/2019 | Coburn | H04L 9/3213 |
| 2019/0058599 A1 * | 2/2019 | Takada Chino | H04L 9/3013 |
| 2019/0065709 A1 | 2/2019 | Salomon | |
| 2019/0082007 A1 | 3/2019 | Klarman et al. | |
| 2019/0108362 A1 | 4/2019 | Miller | |
| 2019/0109877 A1 * | 4/2019 | Samuel | H04W 4/70 |
| 2019/0141048 A1 * | 5/2019 | Fallah | H04L 9/0643 |
| 2019/0149418 A1 * | 5/2019 | Bertsche | G06Q 20/223 707/625 |
| 2019/0155997 A1 | 5/2019 | Vos et al. | |
| 2019/0180368 A1 | 6/2019 | Payne et al. | |
| 2019/0180519 A1 * | 6/2019 | Hausman | G07B 15/063 |
| 2019/0207768 A1 | 7/2019 | Hardy et al. | |
| 2019/0251648 A1 | 8/2019 | Liu et al. | |
| 2019/0279227 A1 | 9/2019 | Chantz | |
| 2019/0286794 A1 * | 9/2019 | Jose | G06F 21/31 |
| 2019/0303543 A1 * | 10/2019 | Savanah | H04L 9/3247 |
| 2019/0306549 A1 | 10/2019 | Dietz et al. | |
| 2019/0318348 A1 | 10/2019 | Brenner et al. | |
| 2019/0324958 A1 | 10/2019 | Ow et al. | |
| 2019/0333096 A1 | 10/2019 | Johnson et al. | |
| 2019/0342336 A1 | 11/2019 | Finkelstein et al. | |
| 2019/0354607 A1 | 11/2019 | Snow | |
| 2019/0354964 A1 | 11/2019 | Snow | |
| 2019/0392118 A1 | 12/2019 | Elden et al. | |
| 2019/0392119 A1 * | 12/2019 | Rahiman | H04L 9/3239 |
| 2020/0034839 A1 * | 1/2020 | Soundararajan | G06Q 20/4014 |
| 2020/0052917 A1 | 2/2020 | Corral et al. | |
| 2020/0074440 A1 | 3/2020 | Fullman et al. | |
| 2020/0082361 A1 * | 3/2020 | Chan | H04L 9/3247 |
| 2020/0097994 A1 | 3/2020 | Seitz et al. | |
| 2020/0134139 A1 | 4/2020 | Vaish et al. | |
| 2020/0134585 A1 | 4/2020 | Xu et al. | |
| 2020/0142682 A1 * | 5/2020 | Marks | G06F 8/65 |
| 2020/0159889 A1 * | 5/2020 | Chui | G06F 21/105 |
| 2020/0159890 A1 * | 5/2020 | Chui | G06F 16/25 |
| 2020/0159891 A1 | 5/2020 | Patel et al. | |
| 2020/0195448 A1 * | 6/2020 | Yang | H04L 9/0643 |
| 2020/0202318 A1 | 6/2020 | Rab et al. | |
| 2020/0204344 A1 * | 6/2020 | Sardesai | H04L 9/0637 |
| 2020/0225643 A1 * | 7/2020 | Tugbo | G05B 19/4155 |
| 2020/0225649 A1 * | 7/2020 | Cahill | H04L 67/12 |
| 2020/0226123 A1 * | 7/2020 | Nixon | G06F 16/2379 |
| 2020/0228316 A1 * | 7/2020 | Cahill | H04L 9/3297 |
| 2020/0228342 A1 * | 7/2020 | Nixon | G06F 21/64 |
| 2020/0250676 A1 | 8/2020 | Sierra et al. | |
| 2020/0252202 A1 * | 8/2020 | Madl | H04L 63/12 |
| 2020/0257775 A1 | 8/2020 | Wright et al. | |
| 2020/0287874 A1 | 9/2020 | Bertram et al. | |
| 2020/0311272 A1 * | 10/2020 | Mondello | G06F 8/65 |
| 2020/0311723 A1 | 10/2020 | Miller et al. | |
| 2020/0313851 A1 * | 10/2020 | Mondello | H04L 9/3247 |
| 2020/0366950 A1 | 11/2020 | Manganilla et al. | |
| 2020/0380156 A1 | 12/2020 | Garg et al. | |
| 2020/0394321 A1 | 12/2020 | Ramos et al. | |
| 2020/0394322 A1 | 12/2020 | Ramos et al. | |
| 2021/0004923 A1 | 1/2021 | Mackenzie et al. | |
| 2021/0026931 A1 | 1/2021 | Todd | |
| 2021/0042803 A1 | 2/2021 | Achkir et al. | |
| 2021/0064584 A1 | 3/2021 | Assadipour et al. | |
| 2021/0073186 A1 | 3/2021 | Shang et al. | |
| 2021/0216306 A1 * | 7/2021 | Moeller | G06F 8/656 |
| 2021/0216527 A1 | 7/2021 | Huang | |
| 2021/0216612 A1 | 7/2021 | Wojcik | |
| 2021/0232568 A1 * | 7/2021 | Yoon | G06F 16/2246 |
| 2021/0243028 A1 | 8/2021 | Song et al. | |

(56) References Cited

U.S. PATENT DOCUMENTS

| | | | |
|---|---|---|---|
| 2021/0248210 A1 | 8/2021 | Panikkar et al. | |
| 2021/0256096 A1 | 8/2021 | Johnson | |
| 2021/0256113 A1* | 8/2021 | Stott | H04L 9/3239 |
| 2021/0256473 A1* | 8/2021 | Londergan | G06F 3/04842 |
| 2021/0256487 A1 | 8/2021 | Johnson | |
| 2021/0279014 A1 | 9/2021 | Kim et al. | |
| 2021/0328777 A1* | 10/2021 | Brooks | H04L 9/3297 |
| 2021/0383428 A1 | 12/2021 | Johnson et al. | |
| 2021/0409799 A1 | 12/2021 | Manganilla et al. | |
| 2022/0058241 A1* | 2/2022 | Ekberg | H04N 5/913 |
| 2022/0122073 A1 | 4/2022 | Hanson et al. | |
| 2022/0231846 A1* | 7/2022 | Panikkar | H04L 9/3236 |
| 2022/0269754 A1 | 8/2022 | Cardo Sanchez et al. | |
| 2023/0004967 A1 | 1/2023 | Davies et al. | |
| 2023/0091483 A1 | 3/2023 | Johnson | |
| 2023/0102889 A1 | 3/2023 | Keiter et al. | |
| 2023/0125507 A1 | 4/2023 | Tartan et al. | |
| 2023/0342374 A1 | 10/2023 | Sitsky et al. | |
| 2023/0385398 A1 | 11/2023 | Balaraman et al. | |
| 2024/0257081 A1* | 8/2024 | Livesay | G06Q 20/3827 |
| 2025/0156828 A1* | 5/2025 | Sliwka | H04L 9/3247 |

FOREIGN PATENT DOCUMENTS

| | | |
|---|---|---|
| WO | 2017145008 A1 | 8/2017 |
| WO | 2017145019 A1 | 8/2017 |
| WO | 2017145020 A1 | 8/2017 |
| WO | 2017167548 | 10/2017 |
| WO | 2017187399 A1 | 11/2017 |

OTHER PUBLICATIONS

OnXCHNG: The Partner Program, xchng.io, 2018, 1 page.

XCHNG, brought to you by Kochava, Kochava Labs SEZC, 2017-2018, pp. 1-33.

Team, T. V. "Disintermediating the Broadcast Industry by Establishing a Blockchain-Based Television Ecosystem." (2017). https://s3.eu-central-1.amazonaws.com/tvtwo/TV_Whitepaper.pdf; pp. 1-40, Nov. 30, 2017.

"Blockchain Scalability: Challenges and Recent Developments", Codementor Blog, Dec. 25, 2018, 32 pages.

"International Preliminary Report on Patentability and Written Opinion", PCT/US2021/01611, Sep. 1, 2022, 9 pages.

"Scaling the Blockchain for Tomorrow's Internet", Jul. 17, 2018, 21 pages.

"Sharding FAQ", On sharding blockchains, Apr. 18, 2019, 39 pages.

"UltraViolet (system)", https://en.wikipedia.org/wiki/UltraViolet_(system), Accessed Apr. 25, 2019, 9 pages.

"Written Opinion and International Search Report", PCT/US2021/016611, May 18, 2021, 10 pages.

Budish, Eric , University of Chicago, "The Economic Limits of Bitcoin and the Blockchain", Jun. 5, 2018, pp. 1-23.

Kravchenko, Pavel , et al., "Distributed multi-ledger and asset exchange model for the financial industry", Sep. 7, 2011, 14 pages.

McEvily, Nicholas , et al., "An Incentivized, Blockchain Enabled Multimedia Ecosystem.", http://www.planetblockchain.io/img/manjakos/3601516300406.pdf; pp. 1-47, Nov. 29, 2017.

Munson, Ben , ""IBM wants to put Blockchain into the ad buying workflow."", Fierce Cable, fiercecable.com, Oct. 19, 2017. https://www.fiercecable.com/broadcasting/ibm-wants-to-put-blockchain-into-adbuying-workflow; pp. 1-4.

Olenski, Steve , "Why Digital Advertising Needs A Blockchain Solution.", Forbes, forbes.com, Feb. 16, 2018. https://www.forbes.com/sites/steveolenski/2018/02/16/why-digital-advertisingneeds-a-blockchain-solution/; pp. 1-2.

Rizun, Peter R., "Subchains: A Technique to Scale Bitcoin and Improve the User Experience", Ledger, vol. 1 (2016), 2016, 9 pages.

Swant, Marty , ""Can Blockchain Technology Solve Digital Marketing's Ad-Fraud Problems?"", AdWeek, adweek.com, Aug. 6, 2017. http://www.adweek.com/digital/can-blockchain-technology-solve-digital-marketings-ad-fraud-problems/; pp. 1-5.

Thorwirth, Niels , "The De-centralized Rights Locker", Society of Motion Picture & Television Engineers, 2018, 11 Pages.

Wise, Bill , "For Blockchain to Work in Ad Tech, We Need To Be Honest About the Challenges.", Media Ocean, meadiaocean.com, Aug. 29, 2017. https://web.archive.org/web/20170909012453/http://www.mediaocean.com/blog/blockchain-work-ad-tech-we-need-be-honest-about-challenges; pp. 1-5.

Wright, Aaron , et al., ""Decentralized blockchain technology and the rise of lex cryptographia."", https://www.cardozo.yu.edu/sites/default/files/SSRN-id2580664.pdf, Mar. 12, 2015, pp. 1-6.

Zhang, Zheng , ""Five ways blockchain can enhance your ad campaigns."", The Block, blockchaintechnology-new.com, Mar. 21, 2018. https://www.blockchaintechnology-news.com/2018/03/21/five-ways-blockchaincan-enhance-your-ad-campaigns/; pp. 1-4, Mar. 21, 2008.

* cited by examiner

231 — REQUESTING A LICENSE

232 — RECEIVING A PASSED LEDGER

233 — APPENDING A LICENSING BLOCK TO PASSED LEDGER

234 — SENDING HASH VALUE FOR RECORDING

235 — SENDING PASSED LEDGER TO LICENSEE

236 — RECEIVING THE PASSED LEDGER FROM LICENSEE

237 — VERIFYING THE HASH VALUE FOR THE PASSED LEDGER

230

300

600

SPLIT LEDGER SOFTWARE LICENSE PLATFORM

CROSS REFERENCE TO RELATED APPLICATIONS

This application is a continuation of U.S. patent application Ser. No. 18/070,683, filed on Nov. 29, 2022, which is a continuation of U.S. patent application Ser. No. 16/793,331, filed on Feb. 18, 2020 (now U.S. Pat. No. 11,556,618). All sections of the aforementioned application are incorporated by reference herein in their entirety.

FIELD OF THE DISCLOSURE

The subject disclosure relates to a split ledger software licensing platform.

BACKGROUND

Software can be distributed under many kinds of licenses, ranging from open-source freeware to pay per use, and everything in between. In large companies and business to business sales, customers often report usage without providing a software vendor with a way to verify how many copies of the software were in use over a given time period. For example, a large company might have an open-ended contract with a software vendor for a ubiquitous product. The license requires the large company to specify a quantity of licenses that were used over a given month or quarter. The quantity of licenses changes for a variety of reasons, including staffing considerations.

One of the more difficult issues is how software handles offline work, as many users are not able to connect to the network every time that they use software. This problem becomes an issue since the software continues to function even if the device gets disconnected from the network. Further, large organizations often prefer bulk contracts that allow multiple users to have access to the software. These bulk contracts should be updated as the conditions of the organization change.

BRIEF DESCRIPTION OF THE DRAWINGS

Reference will now be made to the accompanying drawings, which are not necessarily drawn to scale, and wherein.

DETAILED DESCRIPTION

Figure 1:
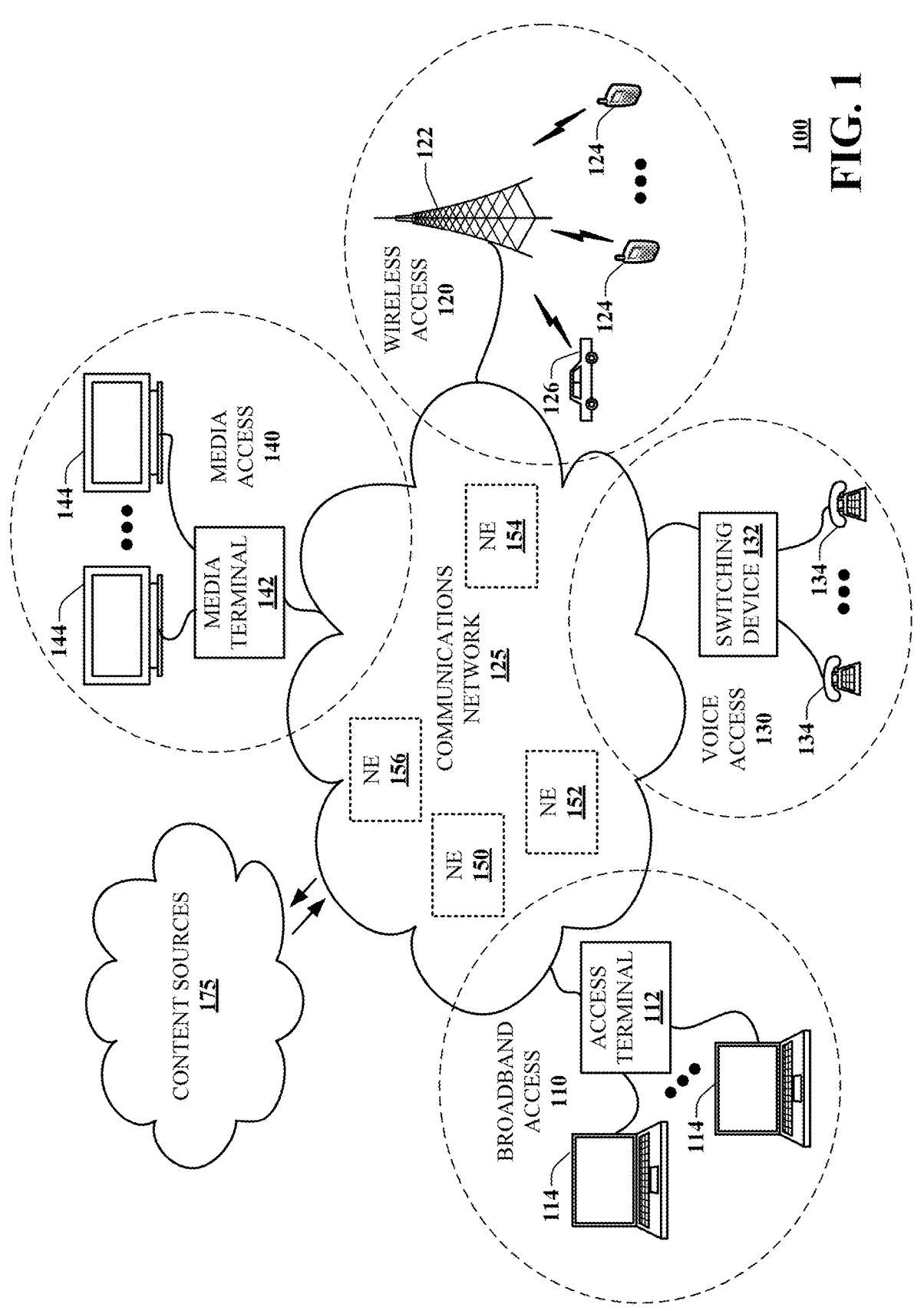
FIG. 1 is a block diagram illustrating an exemplary, non-limiting embodiment of a communications network in accordance with various aspects described herein.

The subject disclosure describes, among other things, illustrative embodiments for a split ledger licensing system and method. Other embodiments are described in the subject disclosure.

One or more aspects of the subject disclosure include a processing system including a processor; and a memory that stores executable instructions that, when executed by the processing system, facilitate performance of operations, including requesting a license for software from first equipment of a license holder; receiving a passed ledger associated with the license from the first equipment of the license holder, wherein the passed ledger includes a latest block; receiving a hash value for the latest block from a software vendor of the software; calculating a hash value for the latest block; and responsive to the hash value provided by second equipment of the software vendor matching the hash value calculated for the latest block: executing the software.

One or more aspects of the subject disclosure include a machine-readable medium with executable instructions recorded thereon that, when executed by a processing system including a processor, facilitate performance of operations, including: sending a license for software to first equipment of a license holder; sending a passed ledger associated with the license to the first equipment of the license holder, wherein the passed ledger indicates the software may be licensed for use; receiving a hash value of a latest block in the passed ledger from the first equipment of the license holder; verifying that the first equipment of the license holder has permission to update the hash value in a hash ledger; recording the hash value of the latest block in the hash ledger; sending the hash value of the latest block from the hash ledger to second equipment of a licensee responsive to a query for the hash value of the latest block, wherein a comparative analysis of the hash value permits execution of the software; and recording permission for the second equipment of the licensee to update the hash ledger.

One or more aspects of the subject disclosure include a method, including: requesting, by a processing system including a processor, a license for a software product from first equipment of a software vendor; receiving, by the processing system, a passed ledger associated with the license from the first equipment of the software vendor, wherein the passed ledger indicates a license available for use; receiving, by the processing system, a request from second equipment of a user to utilize the license; appending, by the processing system, a latest block to the passed ledger, wherein the latest block indicates licensed use by the second equipment of the user; calculating, by the processing system, a hash value of the latest block; sending, by the processing system, the hash value of the latest block to the first equipment of the software vendor for recording in a hash ledger; and sending, by the processing system, the passed ledger to the second equipment of the user.

Referring now to FIG. 1, a block diagram is shown illustrating an example, non-limiting embodiment of a system 100 in accordance with various aspects described herein. For example, system 100 can facilitate in whole or in part sending or receiving a passed ledger associated with a software license, requesting licenses from a license holder, or verifying or updating hash values with a software vendor of software. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VOIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
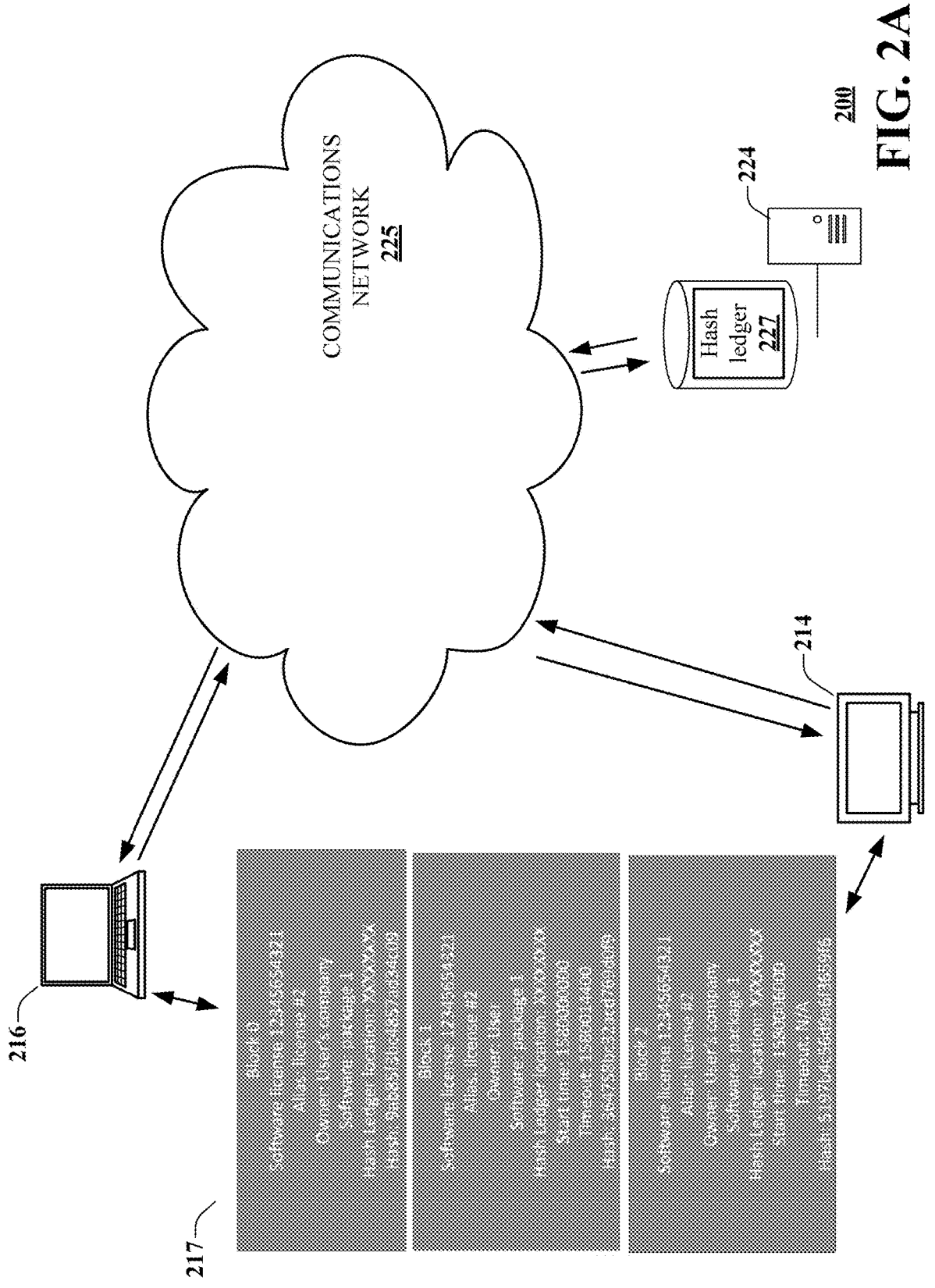
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system for implementing software licensing using a split ledger in the communication network of FIG. 1 in accordance with various aspects described herein. As shown in FIG. 2A, system 200 comprises a communications network 225, an administrator's device 214, a user's device 216, a split ledger comprising a passed ledger 217 and a hash ledger 227, wherein the hash ledger 227 is securely stored on a software publisher's server 224 in communication with the communications network 225.

The passed ledger 217 is made up of a series of blocks. Block 0 is the initial block generated by the software publisher. Block 0 records an initial sale to a license owner (licensor). Block N (blocks 1, 2, 3, and so on) represents a single transaction, such as requesting and granting of a license to a specific instance of the software or returning license to the licensor. Each block ends with a hash of the block, which is then shared with the hash ledger 227, and used as the starting information for the next block.

The passed ledger 217 is passed from one entity to another. In an embodiment, the passed ledger 217 is passed from the software publisher's server 224 (at creation) to the licensor, i.e., the administrator's device 214, and then onto an application program interface (API) running in the software on the user's device 216. When the user is done with the program, the API sends the passed ledger 217 back to the administrator's device 214. Thereafter, the passed ledger 217 is passed back and forth between the administrator's device 214 and the user's device 216. The name and location of either party may change, such as moving a license from one machine to a new one, or if the software publisher sells the rights to the software to another vendor.

The hash ledger 227 is maintained by the software publisher's server 224 as a shared record between the administrator's device 214 and the user's device 216. An identifier for each block written into the passed ledger 217 is recorded in the hash ledger 227 as well. The entries in the hash ledger 227 contain only the proof for the block, not the actual content. As such, the hash ledger 227 does not reveal the information stored in the block of the passed ledger 217 that created the hash. A reader of the hash ledger 227 would only be able to verify recording of a hash value, who wrote the hash value, when, and who has permission to write to the passed ledger 217.

When a software publisher creates a software product, i.e., an application, the software publisher has an opportunity to create licenses for that application. Each license comprises a key that unlocks the software. The buyer of the application provides the proper key in order to use the application. In an embodiment, the application would be able to prove that a license sold to a licensor is valid by using the unique split ledger created for the license sold.

In an embodiment, a user starting the application for the first time on the user's device 216 requires an Internet connection to pass messages to the licensor. The application software will begin initializing and prompt the user to request a key for the application, and in the background, the API will signal the licensor that a key is required. The licensor can respond with the passed ledger 217 that the API should append, provided one is available, as well as the location of the hash ledger 227. Once the ledgers are created, the software publisher's server 224 fills in the first block pair with the information from the licensor, recording the initialization on the passed ledger 217 and reporting the hash to the hash ledger 227.

The software publisher's server 224 then passes the passed ledger 217 to the licensor (i.e., the administrator's device 214), which maintains a catalog of licenses and the users for which the software application can be used. The passed ledger 217 block zero from the software publisher's server 224 contains the information on the key, as well as the conditions of use, such as lifespan, and if the license may be shared, etc.

When a user (on a user's device 216) requests a key, the licensor verifies that a license is available for the user. The request may be denied if no license is currently available. Once the licensor has found an available license, the licensor provides the passed ledger 217 to the user. The user's program then appends a block to the passed ledger 217 and returns the completed block to the licensor, which verifies the block and updates the hash ledger 227. The block recorded in the passed ledger 217 is in a plain text format. The block includes a hash of the previous block, header data that includes information about the creation of the block, and body data that includes information about what transaction is being recorded. Any hashing algorithm can be used provided that the amount of time required to find a collision (i.e., a block containing different information that will produce a hash value that is the same as another block) for the algorithm is much greater than the lifespan of the block, i.e.:

$$T\_((collision)) >> T\_((lifetime\ of\ block))$$

In other words, the lifetime of a block should be much, much less than the time required to find a collision. The receiver of the block (i.e., the user of the software) performs the hashing calculation, and the licensor verifies the calculation.

In an embodiment where there is a high amount of natural trust, such as users internal to a company, there is no need to increase difficulty of the hashing algorithm. As such the hashing algorithm selected should be one that is very fast, meaning that it does not take long to solve a block. Further, there is no need for a nonce to obscure data in the first block, as there would be for sharing personal data.

In an embodiment where there is less inherent trust, some measures can be used to increase the complexity of the hashing algorithm. For some slower hashing algorithms there is an inherent delay, which makes the amount of time to find a collision through brute force attacks computationally prohibitive, such that the amount of time needed to determine such a block would far exceed the lifetime of the software license. The next option is a hashing algorithm having a much longer output. As generally notable, the longer the output, the lower the chance of collision. Collisions cause blockchains to run into difficulty, as technically more than one block can be presented as the correct question to the proven answer.

Key discovery is when a fraudulent user discovers the secret key of another user. Studies have been done on the security risks and lapses that come from accounts having simple keys, and there are several papers on both bitcoin and Ethereum cases where accounts were quickly drained as soon as they were filled. This can be thought of as a rainbow table attack where a thief generates a list of private keys, determines the corresponding public keys, and then waits for the public key (account) to become active. A solution to this problem is described below for low value software. Any thief that gains access to the chain and can report a new block that indicates ownership passing to themselves would, however, only last as long as the licensor allows before a timeout. In this scenario, if the passed ledger is not returned, the chain is recycled, and a new split ledger is begun. For high value software, there could be two safeties in place: Immediate sharing of blocks to the licensor (which would be notified by the update in the hash ledger). In this scenario, the API of the user shares the block (not the rights per se) with the licensor, and at the same point they share the hash with the hash ledger. For even higher value software (such as industrial controls) the API could require that the block be shared with the licensor, who maintains all rights to update the hash ledger. Therefore, the API runs the application, requests the license, completes the block, and then waits for verification from both the passed ledger and the hash ledger before starting the software. The licensor would check credentials for the user, a serial number of the user device, and potentially a token or one time password, and then determine the likelihood for a need to create a new block.

Once the hash ledger 227 is updated, the API running on the user's device 216 can query the hash ledger 227 to verify that the new block has been added to the passed ledger 217, thereby permitting the application to run on the user's device 216.

In an embodiment, the split ledger technology is based on a notion of limited trust. Cryptocurrencies were created in a way that moved trust from a central institution to a mathematical formula. This shift in trust allowed for a very secure transaction to happen between two parties who do not trust each other, to occur without requiring them to put their trust in a third party. A blockchain implementation for cryptocurrencies helped to create the system, which is described as trustless. However, most transactions involve activities that occur away from the blockchain, which means that there is still a limited amount of trust required, even for cryptocurrency transactions. For example, if a user pays for something using a cryptocurrency, the user should trust that whatever they paid for will be delivered as promised, since the cryptocurrency payment will be permanently written on the blockchain.

This limited trust system provides incentives for each participant. The seller benefits by being able to sell their asset for money, the buyer benefits by getting access to the software that they were trying to purchase, and the entity that maintains the hash ledgers benefits by providing this service, known as Keys as a Service (KaaS). KaaS is a business model that publishers and users ensure the integrity of the transactions by partnering with an entity that they can share a limited amount of trust. This partner is never given the data about what the transaction held, nor any payment details. The partner is simply provided with the next key and expected to append the next key to the hash ledger. This service can be provided at a minimal cost to maintain access to the data stored in the hash ledger and maintain the permissions as to whom can update the hash ledger next. As such, the role of KaaS is to ensure that the chains can move forward as needed by the users. The users pay a small fee based on the smart contract decided at the creation of the chain with the KaaS. At times, potential users may request the hash ledger from the KaaS provider. Potential users would make such requests to verify the contents of the passed ledger or to identify the party who currently owns the license. Since every asset has a unique pair of chains, the naming convention can be standardized. The information on where to find the hash ledger is encoded into the title of the passed ledger, which creates a simple path to verify the content is in fact correct.

In general, the greatest risk to the system is key loss, or key discovery. If a user loses their key while they are the owner of a blockchain, then they lose the right to update the chain with that key. A protocol to recall chains through replacement will be necessary. In such a protocol, the owner of the license (as opposed to the user), the publisher, and the KaaS provider agrees that the old chain is null and only a new chain is valid. This could be accomplished by simply deleting the hash ledger.

In an embodiment, the software publisher creates the passed ledger for the licensor and maintains control of the hash ledger. Hence, the software publisher should be an entity that both the user and the licensor can trust to accurately maintain these logs. Each participant can fully trust that the mathematical checks will be accurate. As such, the participants can "fully trust" the transactions in the same way that a traditional blockchain trusts that the miners' math will be correct.

But neither entity should trust the software publisher with sensitive data, such as payment information, personally identifying information (PII), or even the software that is being protected. In most instances, the specific software might need to be included, so that limited use ledgers cannot be mixed with full use ledgers. For internal business use cases, the relationship between user and licensor is one of trust; however, there could be other use cases where there is a lack of trust. Limited trust only works in situations where the success of the third party can be tied to the success of the other parties involved in the situation. In an example of limited trust without mutual gain, a homeowner may give a spare house key to a neighbor so that the neighbor can gain access to the house in the event of an emergency. But the homeowner may not give the neighbor a code to an alarm system for the house, so that the neighbor cannot access the house undetected. Mutual gain can be achieved if the neighbors exchange their keys.

In an embodiment, the software licensing platform can embody smart contracts, like traditional smart contracts implemented by the Ethereum network or the Hyperledger project. A smart contract can be described as an If/Then statement, where it is understood that two parties would agree on the input "If" (e.g., "If the time is between 13:00 and 21:00 GMT . . . ") and therefore they can be assured that they agree on the output "Then" (Then user 1234 can have full access to license 9876 until 21:00 GMT), without the other party's verification.

At the completion (i.e., expiration) of a smart contract, one of two things should happen: either 1) the contract should end or 2) a continuance should be granted. If the software governed by the smart contract is going to continue to be used, the license should be updated. To update the license, the following series of events occurs: first, the software API queries the hash ledger (1) to make sure there has been no change, then the software API updates the passed ledger (2) with a request for a new key and passes the newly added block to the licensor (3). Next, the licensor alerts the software vendor (4) to the updated hash ledger. The vendor may query the passed ledger (5) and determine the validity of the request (larger organizations may have limits on the number of active accounts or which users are still valid). If the account is still valid, a new block is written to the passed ledger and the hash is recorded on the hash ledger (6). The user's API then queries the hash ledger (7) and plugs in the new key for the application. The new key will have a predefined lifespan, after which another set of blocks should be appended, if the license is to be further extended.

In an embodiment, the system provides an opportunity to track the cost of using a product, and the payment received. Additionally, the user may not always be the party bearing the cost, as advertisers may front the money in exchange for a user viewing an ad. Additional "in lieu of payment" options might include proof of good work, either for professionals utilizing software in a way which demonstrates the software's capabilities or a charitable function where users can collaborate on projects and can apply the time worked towards the use of a software platform. All these costs and payments should be tracked; however, the details of each transaction can remain hidden from the system to maintain industry trade secrets.

In an embodiment, the API in the user's copy of the software would request the passed and hash ledgers, verify they are accurate, compute new blocks, and check the validity of the smart contract. For offline services, the smart contract sets parameters regulating the time period in which the license remains valid. For connected use cases, the smart contract may be stored on a cloud instance and require the software to check in periodically.

Figure 2B:
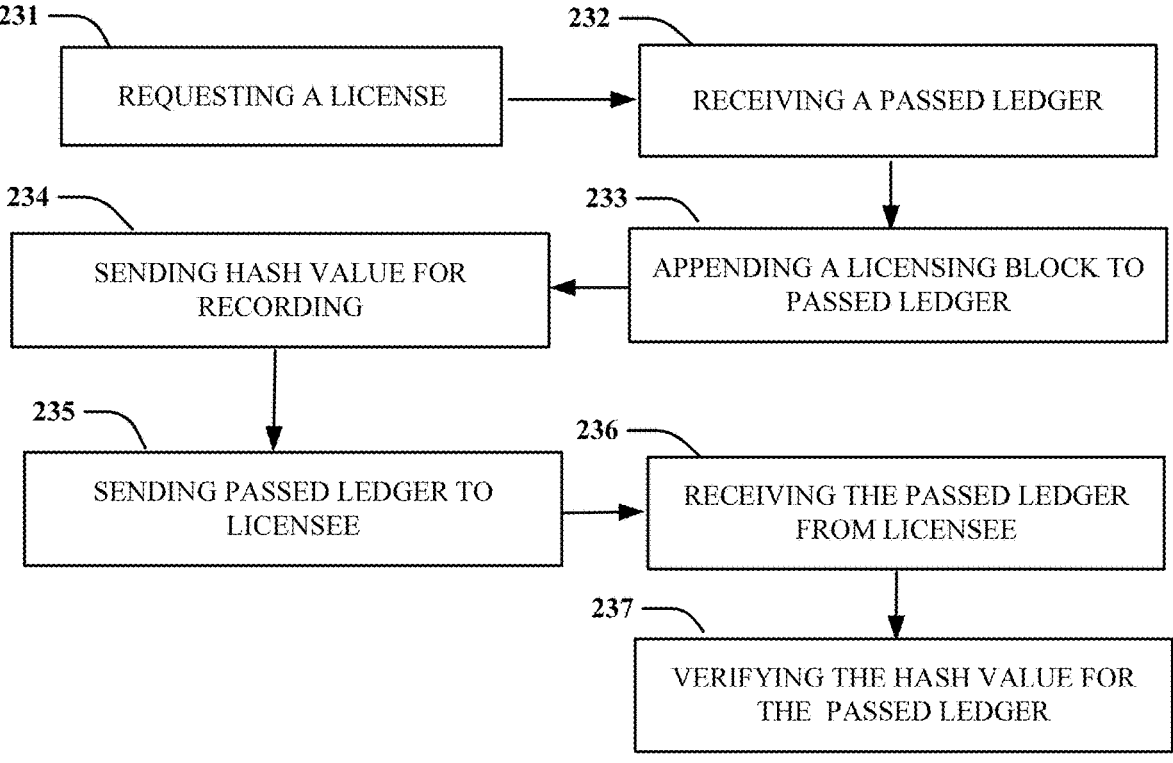
FIG. 2B depicts an illustrative embodiment of a method of software licensing in accordance with various aspects described herein.

FIG. 2B depicts an illustrative embodiment of a method of software licensing in accordance with various aspects described herein. As shown in FIG. 2B, the method begins at step 231, where the prospective licensor for a licensed product requests the license from a vendor. In an embodiment, the licensed product is software, and the vendor is a software publisher or a creator of the licensed product. In an embodiment, the licensor is a company that used the software.

Next in step 232, the licensor receives a passed ledger from the vendor. In an embodiment, the passed ledger indicates that the licensed product is available for licensed use.

Next in step 233, the licensor creates a licensing block for the licensed product and appends the block to the passed ledger. In an embodiment, the licensing block is created in response to a request from equipment of a user desirous to use the licensed product. In an embodiment, the user is a member of the company who launches the software, which in turn creates the request. In an embodiment, the licensing block identifies the user as a licensee.

Next in step 234, the licensor calculates a hash value for the licensing block and sends the hash value to the vendor. In an embodiment, the vendor records the hash value in a hash ledger. In an embodiment, the hash ledger is maintained by the vendor, a third party on behalf of the vendor, or an owner of the right to grant the license.

Next in step 235, the licensor sends the passed ledger, including the licensing block, to the equipment of the user. In an embodiment, sending the passed ledger to the equipment of the user is contingent upon payment via a smart contract. In an embodiment, the equipment of the user calculates a hash value for the licensing block, requests the hash value recorded for the passed ledger from the vendor, and compares the hash value received from the vendor to the hash value calculated for the licensing block. If the compared values are the same, then the equipment of the user continues to use the licensed product, e.g., continues execution of the software. In an embodiment, the equipment of the user continues execution of the software until expiration of a timer recorded in the licensing block. In another embodiment, the equipment of the user periodically sends a message to query the hash ledger and stops use when the latest value changes from that of the license block.

Next in step 236, the licensor received the passed ledger back from the licensee. In an embodiment, the licensee appends a new block to the passed ledger that indicates the licensed use has ended, and that the software is available for further licensed use. In another embodiment, the licensor appends the new block to the passed ledger.

Next in step 237, the licensor verifies the hash value recorded in the hash ledger by requesting the hash value from the vendor and comparing the hash value received to a hash value calculated from the passed ledger.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
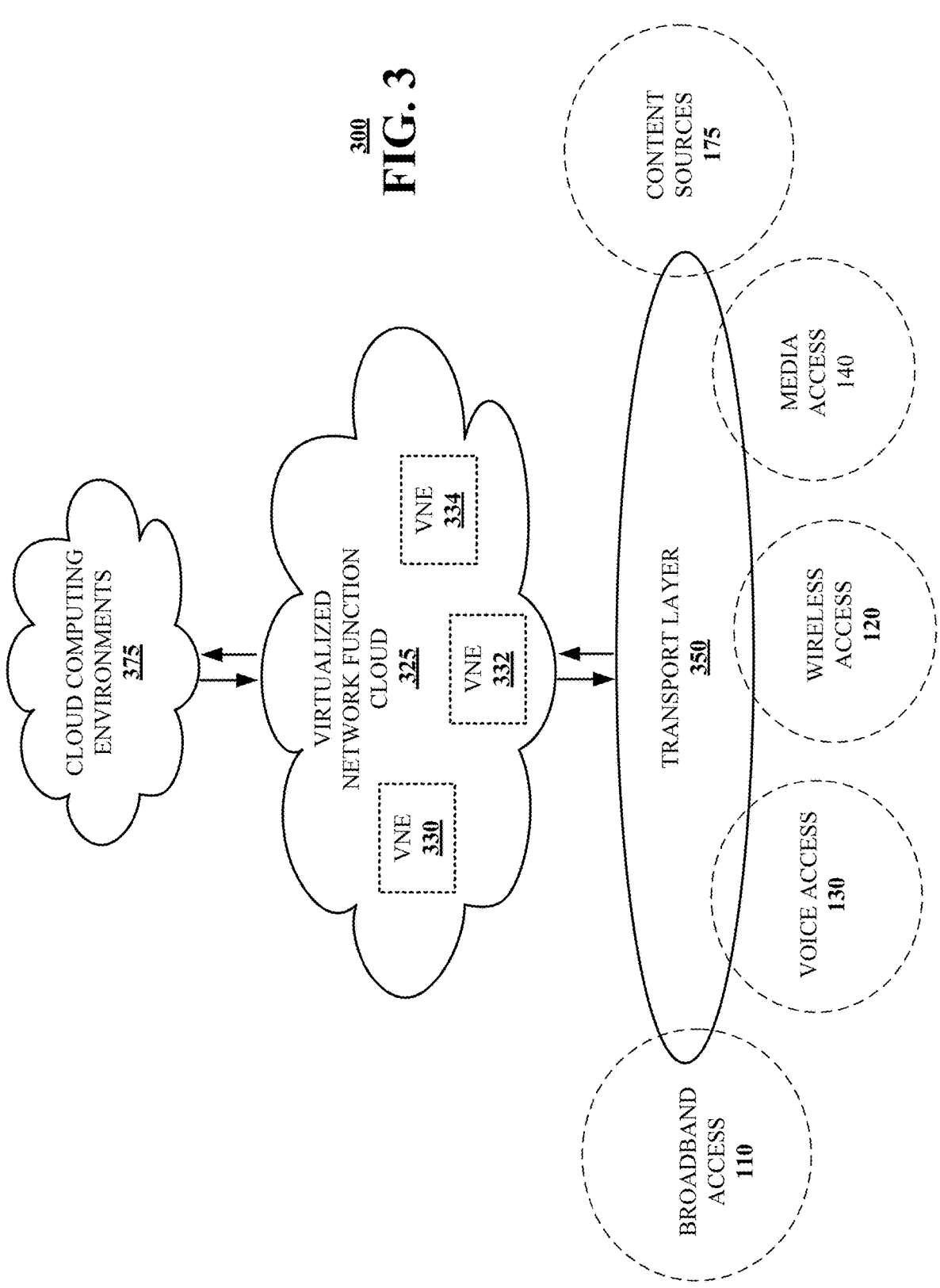
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. A virtualized communication network is presented that can be used to implement some or all the subsystems and functions of system 100, the subsystems and functions of system 200, and method 230 presented in FIGS. 1, 2A, 2B and 3. For example, virtualized communication network 300 can facilitate in whole or in part sending or receiving a passed ledger associated with a software license, requesting licenses from a license holder, or verifying or updating hash values with a software vendor of the software.

A cloud networking architecture is shown that leverages cloud technologies and support rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed as needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In some cases, a network element should be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically forward substantial amounts of traffic, their workload can be distributed across several servers—each of which adds a portion of the capability, and which creates an overall elastic function with higher availability than its former monolithic version. These virtual network elements 330, 332, 334, etc. can be instantiated and managed using an orchestration approach like those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. Network workloads may have applications distributed across the virtualized network function cloud 325 and cloud computing environment 375 and in the commercial cloud or might simply orchestrate workloads supported entirely in NFV infrastructure from these third-party locations.

Figure 4:
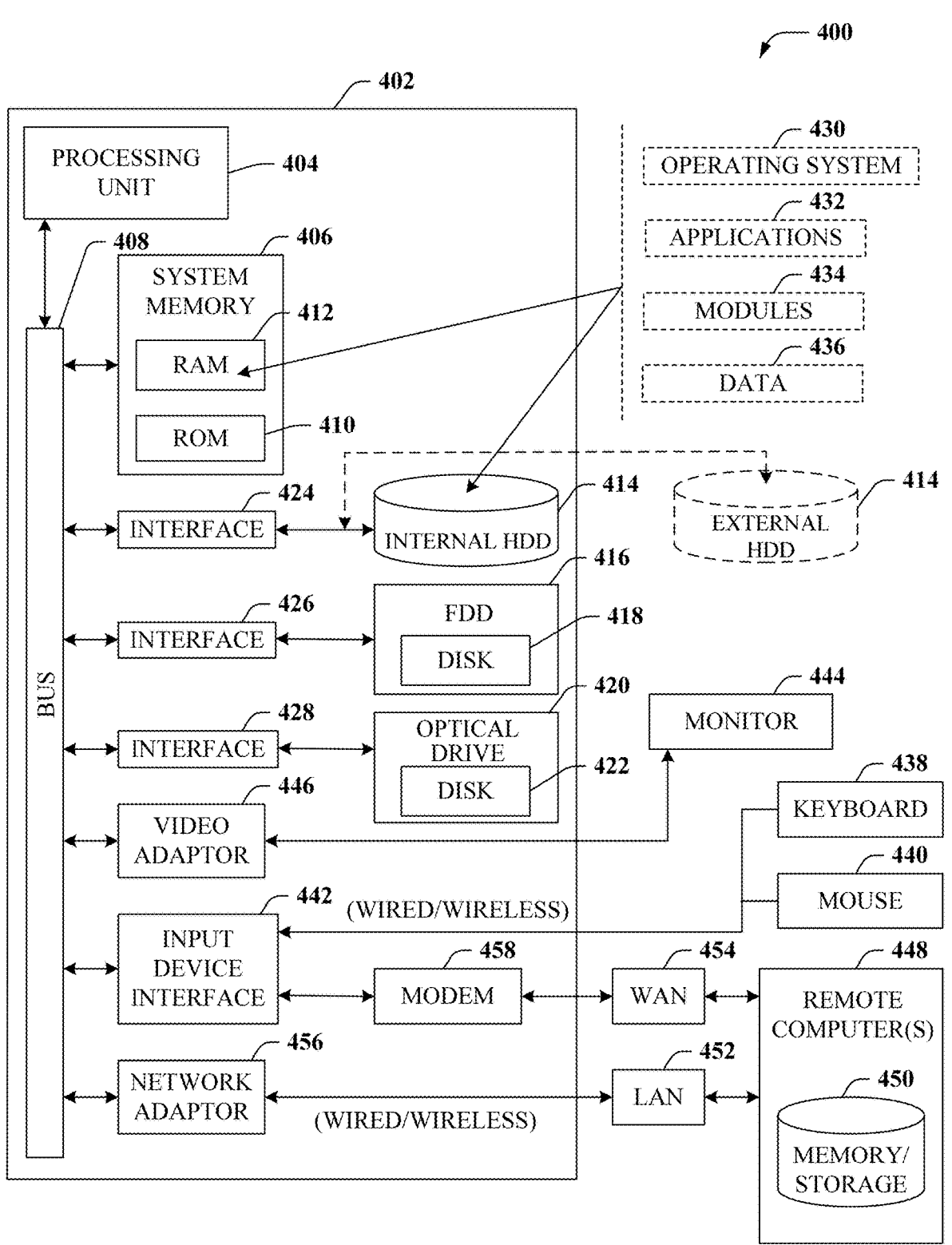
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. Computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part computing blocks and hash values for blocks in the passed ledger and verifying that information recorded in of the passed ledger is accurate.

Generally, program modules comprise routines, programs, components, data structures, etc., that perform tasks or implement abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can also be practiced in distributed computing environments where certain tasks are performed by remote processing devices that are linked through a communications network. In a distributed computing environment, program modules can be in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

Several program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can also be connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are examples and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology like that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance like the basic 10BaseT wired Ethernet networks used in many offices.

Figure 5:
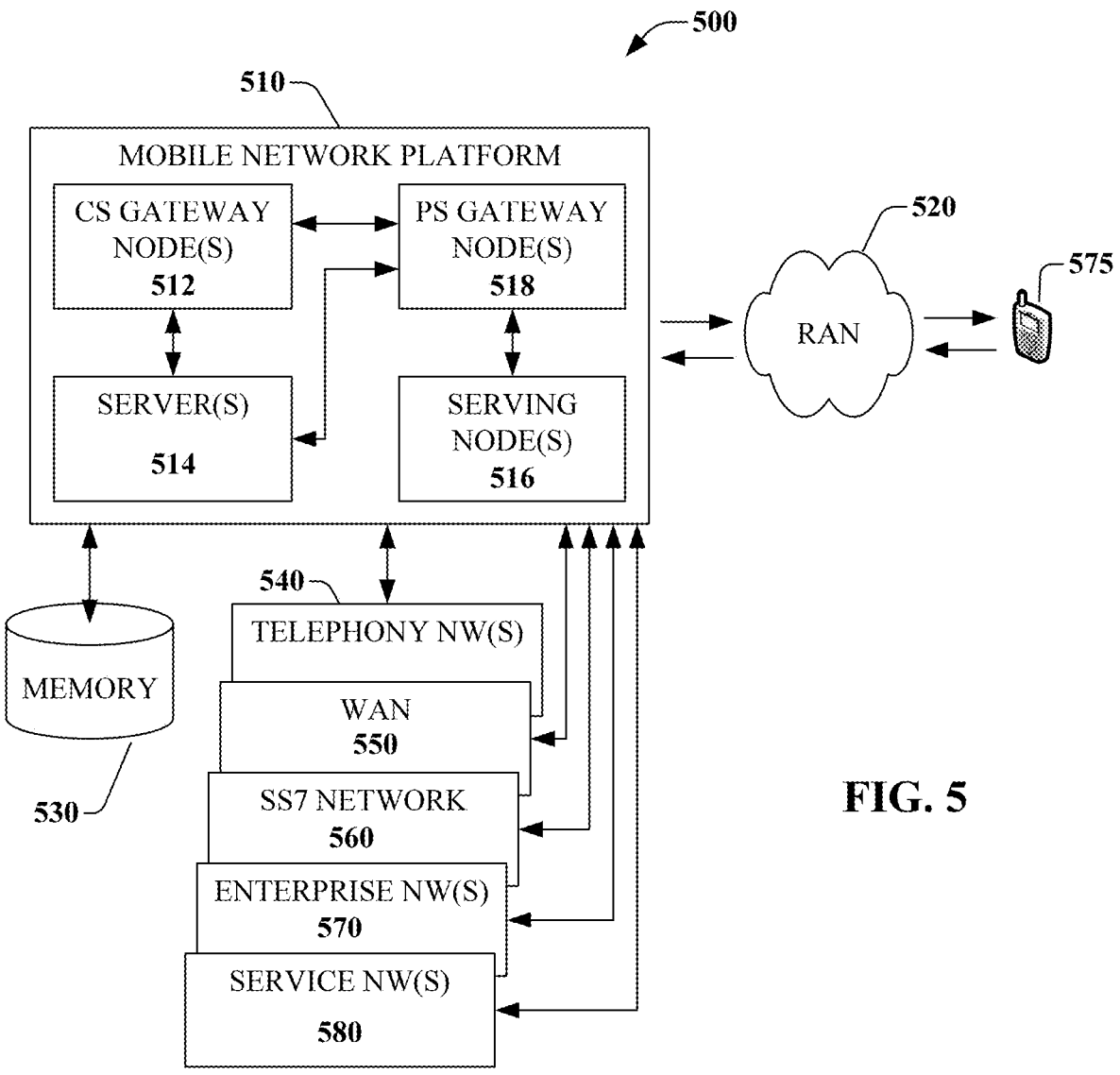
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in executing software, computing blocks and hash values for blocks in the passed ledger and verifying that information recorded in of the passed ledger is accurate. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform tasks and/or implement abstract data types.

Figure 6:
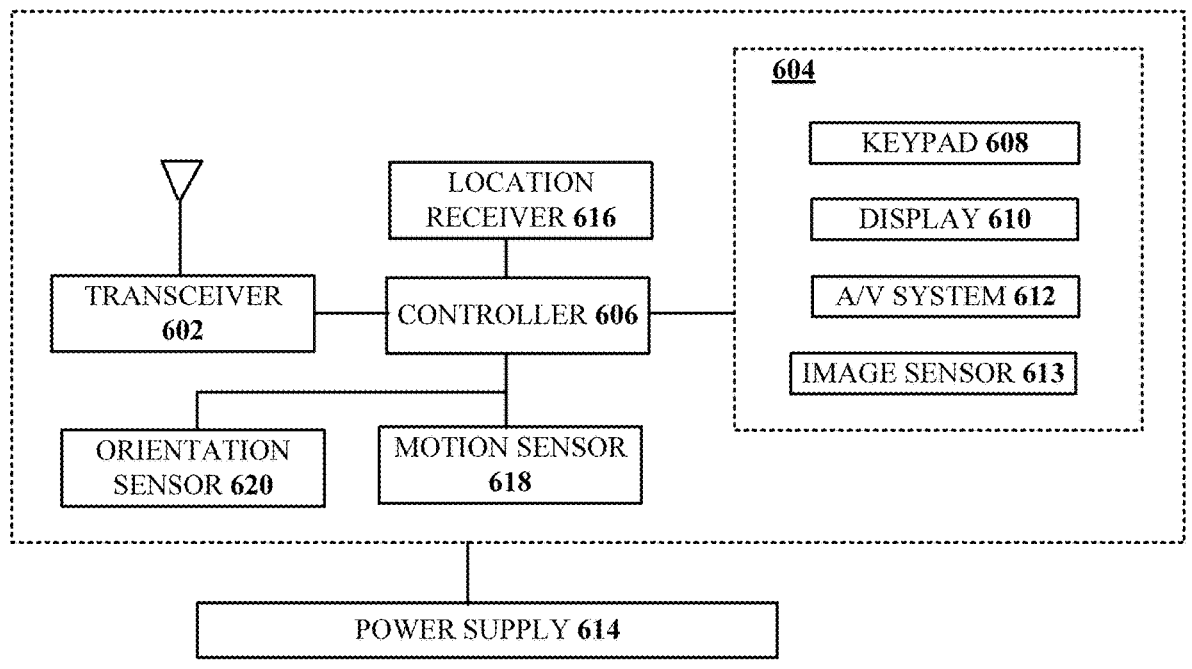
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part equipment of the user, the administrator's device 214, the equipment of the user (user's device 216), the software publisher's server 224, or elements of communications network 225 that enable maintenance and administration of the passed ledger 217 and the hash ledger 227.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/

GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)=$ confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. Yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to," "coupled to," and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all the features described with respect to an embodiment can also be utilized.

What is claimed is:

1. A device, comprising:

a processing system including a processor; and a memory that stores executable instructions that, when executed by the processing system, facilitate performance of operations, the operations comprising:

receiving a first hash value stored in a hash ledger from a first equipment that maintains the hash ledger, wherein the hash ledger is associated with licensing a software;

receiving a latest block of a passed ledger provided by second equipment of a license holder of the software; and executing the software, wherein the software is only permitted to execute when the first hash value matches a second hash value calculated from the latest block of the passed ledger.

2. The device of claim 1, wherein the operations further comprise: calculating the second hash value for the latest block.

3. The device of claim 1, wherein the operations further comprise:

determining a new block for the passed ledger, wherein the new block indicates completion of use of licensed use of the software;

calculating a third hash value for the new block; and sending the third hash value to the first equipment for recording in the hash ledger.

4. The device of claim 3, wherein the operations further comprise:

appending the new block to the passed ledger; and sending the passed ledger to the second equipment of the license holder, wherein the second equipment of the license holder calculates a fourth hash value from the new block and verifies that the fourth hash value matches the third hash value recorded in the hash ledger.

5. The device of claim 1, wherein the executing of the software is contingent upon payment via a smart contract.

6. The device of claim 1, wherein the operations further comprise:

completing the executing of the software; and sending the passed ledger to the second equipment of the license holder.

7. The device of claim 6, wherein the software completes execution upon expiration of a timer specified in the latest block of the passed ledger.

8. The device of claim 1, wherein the operations further comprise:

periodically sending a message to the second equipment indicating that the software is executing; and completing the executing of the software upon failing to receive a response to the message.

9. The device of claim 1, wherein the processor comprises a plurality of processors operating in a distributed computing environment.

10. A non-transitory, machine-readable medium, comprising executable instructions that, when executed by a processing system including a processor, facilitate performance of operations, the operations comprising:

receiving a first hash value stored in a hash ledger from a first equipment that maintains the hash ledger, wherein the hash ledger is associated with licensing a software;

requesting a latest block of a passed ledger from a second equipment of a license holder of the software; and executing the software, wherein the software is permitted to execute if the first hash value matches a second hash value calculated from the latest block of the passed ledger.

11. The non-transitory, machine-readable medium of claim 10, wherein the operations further comprise:

receiving a third hash value for a new block of the passed ledger, wherein the new block indicates completion of licensed use of the software;

recording the third hash value of the new block in the hash ledger; and sending the third hash value of the new block responsive to a second query from the second equipment of the license holder, wherein the second equipment of the license holder verifies the third hash value of the new block recorded in the hash ledger.

12. The non-transitory, machine-readable medium of claim 10, wherein the execution of the software is contingent upon payment via a smart contract embedded in the passed ledger.

13. The non-transitory, machine-readable medium of claim 10, wherein the software completes execution upon expiration of a timer specified in the latest block of the passed ledger.

14. The non-transitory, machine-readable medium of claim 13, wherein the software completes execution upon failing to receive a response to a message periodically sent indicating permitted continued use of the software.

15. The non-transitory, machine-readable medium of claim 14, wherein the operations further comprise:

periodically sending a message to the second equipment indicating that the software is executing; and completing the executing of the software upon failing to receive a response to the message.

16. The non-transitory, machine-readable medium of claim 10, wherein the latest block indicates licensed use of the software.

17. The non-transitory, machine-readable medium of claim 10, wherein the processor comprises a plurality of processors operating in a distributed computing environment.

18. A method, comprising:

receiving, by a processing system including a processor, a first hash value stored in a hash ledger from a first equipment that maintains the hash ledger, wherein the hash ledger is associated with licensing a software; and executing, by the processing system, the software, wherein the software is permitted to execute when the first hash value matches a second hash value calculated from a latest block of a passed ledger held by second equipment of a license holder of the software.

19. The method of claim 18, further comprising: requesting the passed ledger from the second equipment, wherein sending of the passed ledger by the second equipment is contingent upon a payment.

20. The method of claim 19, further comprising:

receiving, by the processing system, the passed ledger;

calculating, by the processing system, the second hash value.

\* \* \* \* \*